Sept. 16, 1952   G. W. NIGH   2,610,504
HYDRAULIC TESTER
Filed April 16, 1948
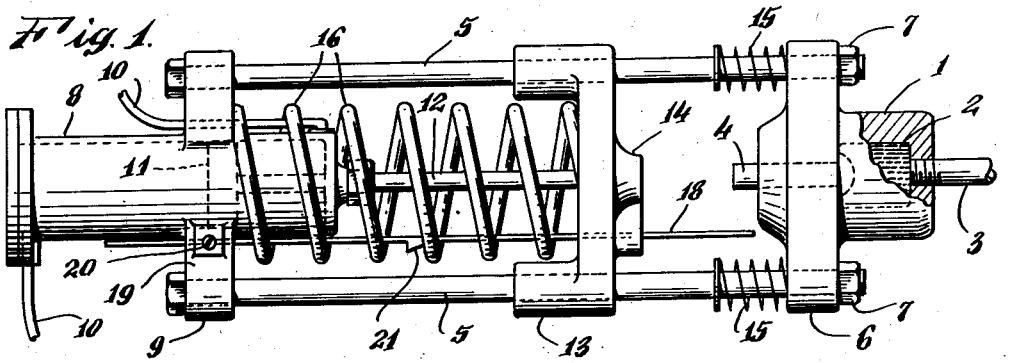
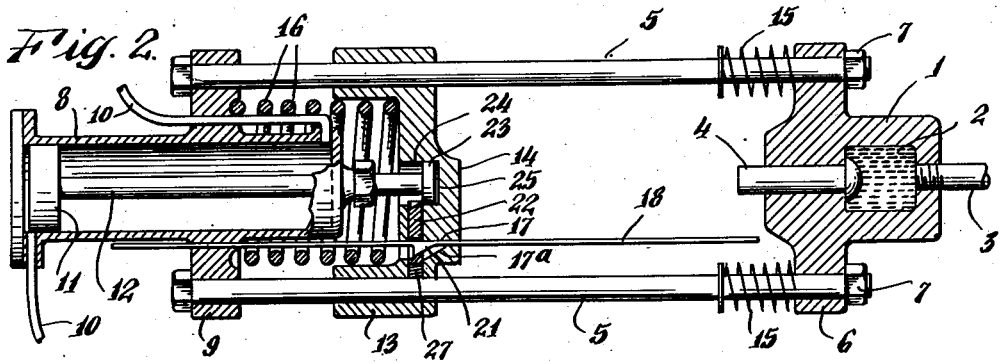
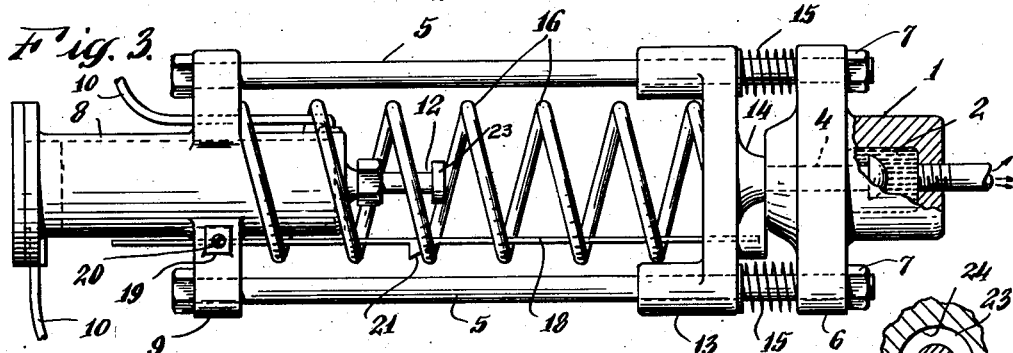
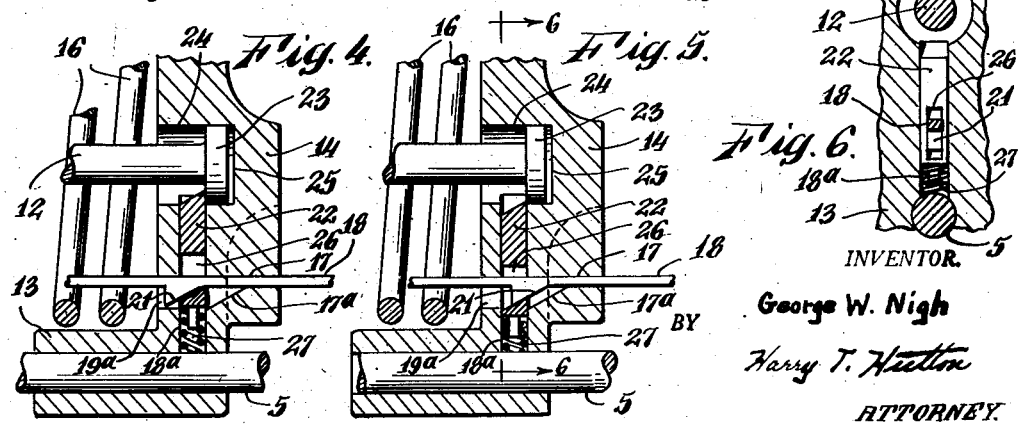
INVENTOR.
George W. Nigh
BY Harry T. Hutton
ATTORNEY.

Patented Sept. 16, 1952

2,610,504

UNITED STATES PATENT OFFICE 2,610,504

HYDRAULIC TESTER

George W. Nigh, Bayonne, N. J., assignor to Tide Water Associated Oil Company, Bayonne, N. J., a corporation of Delaware Application April 16, 1948, Serial No. 21,502

11 Claims. (Cl. 73—12)

The present invention is an apparatus for testing the strength of hollow articles such as tubes or pipes by the application of force to the walls of such articles by means of a hydraulic fluid. More particularly, the invention relates to an improved hydraulic apparatus for the shock-testing of tubes and the like in which force is applied suddenly to the walls thereof.

Testing apparatus employing the principle of sudden application of hydraulic pressure or impact force in the testing of tubes is known. The general principle of operation involved in such apparatus and which is also used in the present invention comprises connecting the tube at one of its ends to a hydraulic system comprising a pressure chamber carrying a plunger, plugging the tube at its other end, filling the tube and hydraulic system with a fluid such as water and applying a sudden, predetermined force to the plunger. The impact force thus applied is transmitted through the hydraulic fluid to all parts of the walls of the tube being tested. Any defective or undesirably weak areas of the tube are thus readily detected by the leaking or spurting of the fluid through its walls at such areas during the test.

In one type of conventional hydraulic tube tester, the impact force is applied to the plunger by means of a falling weight which is lifted above the plunger to a predetermined height and then permitted to drop by force of gravity onto the plunger. These gravity-actuated devices have several disadvantages, perhaps the foremost of which resides in the fact that they must be in a substantially vertical position during the testing operation, which limits their use to locations where sufficient vertical space exists. It is often desired to test the tubes of condensers, heat-exchangers or the like in place, as for example, while installed in relatively inaccessible positions as parts of larger units where no adequate and immediate vertical space is provided for the test equipment. Further, gravity-actuated testers are heavily constructed and, consequently, cumbersome and relatively difficult to transport from job to job. The falling weight which actuates the plunger is of itself considerably heavy and the guides or standards carrying said weight and other parts of the machine necessarily are constructed of relatively large stock for adequate support of the weight.

The instant invention aims to provide an improved hydraulic tester; one which avoids the disadvantages of those referred to above. A major object is to provide a hydraulic tube testing apparatus which is relatively compact and light in weight and which is adapted for successful operation in non-vertical as well as in vertical positions.

In general concept, the novel and improved apparatus of this invention comprises a hydraulic system adapted for hydraulic connection to a tube or other hollow article to be tested, carrying a plunger or equivalent means for conveying force to the hydraulic fluid within the system and means including a resilient member for applying an impact force to said plunger. More particularly, the invention resides in a tube-tester in which the impact force may be varied and predetermined and in means for accomplishing such results including an automatic adjustable mechanism for releasing force applying means.

The apparatus of the invention may be more readily understood by reference to the accompanying drawings showing one embodiment thereof in which: Figs. 1, 2 and 3 are plan views of the apparatus partly in section showing the apparatus in various positions of operation of its essential parts. Figs. 4 and 5 are plan views partly in section of the movable crosshead showing details of one embodiment of a release mechanism in two respective positions. Fig. 6 is a sectional view taken on line 6—6 of Fig. 5 of the release mechanism to be described.

In the drawings, I represents a pressure cylinder block having a hydraulic pressure chamber 2, which is connected at one end to a conduit 3 for communication with a tube to be tested (not shown). At its other end, hydraulic pressure chamber 2 is fitted with a plunger 4 in liquid-tight sliding relationship. Guide bars or standards 5 are rigidly fastened to lugs 6 of the pressure cylinder block as by means of nuts 7 and are similarly fastened at their opposite ends to lugs 9 of an air cylinder 8. The air cylinder 8 is provided with conduits 10 for inlet and outlet of air and carries within its bore a piston 11 fastened to a piston rod 12. Mounted slidably upon standards 5 is a crosshead 13 which carries an impact plate 14 in alignment with plunger 4. Standards 5 also carry shock absorber springs 15 which coil loosely around the standards and abut the lugs 6 of the pressure cylinder block, all as clearly shown in Figs. 1, 2 and 3. On the other side of the crosshead is coil spring 16 which preferably is rigidly fastened at one of its ends to lugs 9 and its other end engages loosely the crosshead 13. Crosshead 13 is bored at 17 so that it will slide loosely along a rod 18 which passes through the bore 17. Rod 18 passes through a guide block 19 rigidly attached to lug 9 and carries a set screw 20 adapted to fix the rod 18 in predetermined positions with respect to the lug 9. Rod 18 carries a cam 21, as shown in Figs. 1, 2 and 3, which is adapted to engage a latch 22, forming part of the release mechanism as shown in Figs. 4, 5 and 6.

As illustrated in Figs. 2, 4 and 5, the piston rod 12 carries upon its end an integral flange 23 which fits loosely in a recess 24 of the crosshead 13 and abuts upon surface 25 of the crosshead. Crosshead 13 has a lateral bore 18a to receive the latch 22, the latter being provided with an elongated slot 26, to receive rod 18, of greater length than the diameter of the rod 18, and with a coil spring 27, normally tending to hold the latch in engagement behind the flange 23 of the piston rod in the position shown in Figs. 2, 4 and 5. The crosshead 13 also is recessed at 17a to permit cam 21 to enter the crosshead. See Figs. 4 and 5. The cam 21 is of such size relative to slot 26 that upon its engagement with the latch, the latch will ride up on the cam and release engagement of the latch with the piston rod flange 23, as shown in Figs. 4 and 5. Latch 22 is beveled on its end for reengagement with the flange, as illustrated.

In operating the machine, the tube to be tested is plugged at one end and at its other end is connected to the conduit 3, either directly or through interconnecting conduits; and the tube being tested, the conduit 3 and the hydraulic chamber 2 are filled with a hydraulic fluid such as water. With the crosshead 13 and coil spring 16 in position shown in Fig. 1, the adjustable rod 18 is set so that the cam 21 will be in a position to release the latch mechanism and disengage the crosshead 13 at a predetermined position of the latter along the standards 5. With the latch 22 in engagement with the piston rod flange in manner illustrated in Fig. 6 and the crosshead in position shown in Fig. 1, compressed air is admitted through tube 10 to the piston rod side of the cylinder 8, which retracts the crosshead away from the plunger 4 and compresses the spring 16 until the release mechanism is actuated due to engagement of the cam 21 with the latch 22, as shown in Figs. 2 and 5, whereupon the crosshead 13 is suddenly forced by action of spring 16 toward and into contact with the plunger 4 by the spring 16. Figure 3 shows the relative positions of the parts just after such contact. The relative positions of cam 21 and latch 22 just before release are shown in detail in Fig. 4.

There is thus transmitted through the hydraulic system to the walls of the tube being tested an impact force which is proportional to the degree to which the coil spring 16 has been compressed prior to release of the crosshead. This force is predetermined by proper setting of the position of cam 21 by adjustment of rod 18 and setting same at a fixed position with set screw 20 prior to the test. It should be clear from the drawings and the above description that the force impinged upon the plunger 4 and upon the tube being tested through the hydraulic system may be adjusted and predetermined whether the apparatus is held in vertical or horizontal position during operation. In other words, the hydraulic tester will operate satisfactorily in a horizontal position as well as in other non-vertical positions and, thus, may be used in areas where it is impossible to place the apparatus vertically during the test.

After the crosshead has been released in the manner described above, it becomes disengaged from piston rod 12 in its travel towards the plunger. In order to retract the crosshead, compressed air is admitted to the cylinder head side of the air cylinder 8 which forces the piston rod into engagement again with the crosshead 13 and actuates the latch to again lock the piston rod and crosshead together so that for the next test air may be again admitted to the piston rod side of the air cylinder to retract the crosshead and compress the coil spring 16 as before.

It should be understood that the drawings merely describe one embodiment of the invention and are not to be considered as limiting the invention to the structure shown in said drawings. For example, the crosshead release mechanism and the use of compressed air for retracting the crosshead shown may be replaced by any equivalent means to accomplish their respective purposes.

It is further understood that the actual force exerted upon the walls of the tube being tested at any given setting of the rod 18 will be predetermined by calibration of the device. The rod 18 may carry a scale calibrated in desired units for convenience in setting the device to release at various positions corresponding to the impact force desired to be exerted upon the plunger.

Inasmuch as the plunger-engaging member, illustrated in one embodiment as a crosshead 13, does not depend upon the force of gravity for its momentum, this member can be of relatively light weight, and its supporting standards or guides consequently can be of relatively light construction. In general, the device of this invention can be made more compact, as compared to gravity-actuated devices for the intended use, because in the tester of this invention, the distance traveled by the plunger-engaging member between its position at time of release and its position of contact with the plunger need not be as great as would be required were the attained momentum due solely to the force of gravity.

Having now described my invention, I claim the following:

1. In a hydraulic tube-testing apparatus in which an impact force is applied to a hydraulic system by a spring-loaded hammer, and containing means for moving the hammer away from the hydraulic system and compressing the spring, the improvement comprising releasing mechanism having a latch holding said hammer and said means in engagement during said movement away from the hydraulic system and latch-engaging means adapted to actuate said latch to release the hammer, said latch-engaging means being adjustable to fixed release positions.

2. Apparatus as described in claim 1 in which the latch-engaging means comprise a cam which is adjustable to fixed distances from the hydraulic system and adapted for engagement with the latch for actuation thereof to release the hammer.

3. Hydraulic testing apparatus comprising in combination a hydraulic chamber adapted for hydraulic connection with a tube to be tested, said chamber having a yieldable portion adapted to be externally impacted to receive and transmit impact force thereto, a spring for exerting impact force on said yieldable portion, an impact member adapted for movement away from said hydraulic chamber as said spring is loaded and for movement toward said hydraulic chamber by said spring to impart force of impact to said yieldable portion whereby said force is transmitted to said hydraulic chamber, spring loading means adapted for engagement with said impact member for moving the same away from said hydraulic chamber as said spring is loaded, locking means for maintaining said engagement during the spring loading stroke and lock-engaging means adapted to actuate said locking means to disengage said impact member from said spring loading means and release said spring, said lock-engaging means being adjustable to fixed release positions of the spring-loading stroke.

4. Apparatus as defined in claim 3 in which the said locking means is carried by the impact member.

5. Apparatus as defined in claim 3 in which the said spring loading means comprises a draw bar adapted for locking engagement with said impact member.

6. Apparatus for hydraulic testing of tubes comprising a rigid hydraulic chamber adapted for connection to a tube to be tested and having a yieldable portion adapted to receive and transmit impact force to said chamber, impact means for applying impact force to said yieldable portion and being movable with respect thereto, resilient driving means for moving said impact means, means for compressing said resilient driving means and moving said impact means away from said yieldable portion, releasing means supported by said impact means for automatically releasing said resilient means and freeing said impact means for movement toward and into contact with said yieldable portion and means for adjusting said releasing means to actuate during the compression stroke at different predetermined distances between said yieldable portion and said impact means.

7. Apparatus, as defined in claim 6, wherein the resilient driving means is a spring.

8. Apparatus, as defined in claim 6, wherein the yieldable portion is a plunger.

9. In a hydraulic tube testing apparatus in which an impact force is applied to a hydraulic system by an impact member loadable by a resilient member, and containing means for moving the impact member away from the hydraulic system and to load said resilient member, the improvement comprising releasing mechanism having a latch holding said impact member and said means in engagement during said movement away from the hydraulic system and latch-engaging means adapted to actuate said latch to release said impact member, said latch-engaging means being adaptable to fixed release positions and being supported in sliding engagement with said impact member.

10. In a hydraulic tube-testing apparatus in which an impact force is applied to a hydraulic system by a spring-loaded hammer, the improvement comprising spring-loading means including a member adapted to engage said hammer, locking means for locking said member and said hammer together and moving said hammer away from said hydraulic system during the spring-loading stroke and adjustable means for automatically unlocking said locking means at a predetermined length of said loading stroke to free said hammer from said member whereby said hammer is propelled free of said member to contact and transmit force to said hydraulic system, said adjustable means being an elongated member having a portion intermediate of its ends fixable at predetermined distances from said hydraulic system and adapted for engagement with and unlocking of said locking means.

11. Apparatus for hydraulic testing of tubes comprising a hydraulic chamber adapted for connection to a tube to be tested and having a yieldable portion adapted to receive and transmit force to said chamber, a spring-loaded hammer member movable away from said hydraulic chamber in a spring-loading stroke to compress said spring and adapted to be propelled into contact with said yieldable portion upon release, means for moving said hammer member in a spring-loading stroke comprising a cylinder and a piston movably positioned therein, said piston carrying a rod member adapted for locking engagement with said hammer member during the spring-loading stroke and for release therefrom for the driving stroke, locking means for locking said rod member and hammer member together whereby said hammer member is withdrawn from said yieldable portion and said spring is compressed by movement of said piston in its cylinder and means for adjusting the length of the spring-loading stroke comprising a member adjustable to different predetermined positions to unlock said locking means by engagement therewith during the spring loading stroke thereby disengaging said rod-member from said hammer to permit propulsion of the hammer by the spring.

GEORGE W. NIGH.

REFERENCES CITED

The following references are of record in the file of this patent:

UNITED STATES PATENTS

| Number | Name | Date |
|---|---|---|
| 1,465,927 | Beaumann | Aug. 28, 1923 |
| 1,708,262 | Davis | Apr. 9, 1929 |
| 1,909,703 | Moore et al. | May 16, 1933 |
| 2,336,078 | Eckstein et al. | Dec. 7, 1943 |

FOREIGN PATENTS

| Number | Country | Date |
|---|---|---|
| 465,804 | Great Britain | May 13, 1937 |